(12) United States Patent
Moschetta et al.

(10) Patent No.: US 9,145,207 B2
(45) Date of Patent: Sep. 29, 2015

(54) REMOTELY CONTROLLED MICRO/NANOSCALE AERIAL VEHICLE COMPRISING A SYSTEM FOR TRAVELING ON THE GROUND, VERTICAL TAKEOFF, AND LANDING

(75) Inventors: Jean-Marc Moschetta, Toulouse (FR); Chinnapat Thipyopas, Bangkok (TH)

(73) Assignee: INSTITUT SUPERIEUR DE L'AERONAUTIQUE ET DE L'ESPACE, Toulouse Cedex (FR)

( * ) Notice: Subject to any disclaimer, the term of this patent is extended or adjusted under 35 U.S.C. 154(b) by 14 days.

(21) Appl. No.: 14/008,707

(22) PCT Filed: Mar. 27, 2012

(86) PCT No.: PCT/EP2012/055435
§ 371 (c)(1),
(2), (4) Date: Oct. 10, 2013

(87) PCT Pub. No.: WO2012/130856
PCT Pub. Date: Oct. 4, 2012

(65) Prior Publication Data
US 2014/0319266 A1    Oct. 30, 2014

(30) Foreign Application Priority Data
Mar. 29, 2011 (FR) ..................................... 11 52585

(51) Int. Cl.
*B64C 39/02* (2006.01)
*B64C 25/36* (2006.01)
*B64D 45/06* (2006.01)

(52) U.S. Cl.
CPC .............. *B64C 39/028* (2013.01); *B64C 25/36* (2013.01); *B64C 39/024* (2013.01);
(Continued)

(58) Field of Classification Search
CPC ...... B64C 25/001; B64C 25/36; B64C 25/66; B64C 37/00; B64C 39/028; B64C 2201/021; B64C 2201/028; B64C 2201/086; B64C 2201/088; B64D 45/06; B60F 5/02; A63H 27/12; A63H 33/005
See application file for complete search history.

(56) References Cited

U.S. PATENT DOCUMENTS 2,678,783 A * 5/1954 Myers ........................... 244/7 B
2,868,477 A * 1/1959 Chaplin ....................... 244/12.1
(Continued)

FOREIGN PATENT DOCUMENTS

EP    1586360    10/2005

OTHER PUBLICATIONS

International Search Report for PCT/EP2012/055435, English Translation attached to original, Both completed by the European Patent Office on Jun. 19, 2012, All together 5 Pages.

*Primary Examiner* — Joseph W Sanderson
(74) *Attorney, Agent, or Firm* — Brooks Kushman P.C.

(57) ABSTRACT

An aerial micro-drone having a fixed wing supporting a propulsion device. The micro-drone has wheels for traveling on the ground, which are attached to the side ends of a section of the wing. The rotational axis Y1 of the wheels is located in front of the center of gravity of the micro-drone. The center of gravity of the micro-drone is located in front of the aerodynamic center of the micro-drone. The rotational axis Y1 of the wheels being aligned with the thrust axis of the propulsion device and the wheels are sized such that the radius D/2 thereof is greater than the distance between the rotational axis Y1 of the wheels and the trailing edge of the wing.

18 Claims, 6 Drawing Sheets

(52) U.S. Cl.
CPC .... *B64C 2201/021* (2013.01); *B64C 2201/086* (2013.01); *B64C 2201/088* (2013.01); *B64C 2201/104* (2013.01); *B64C 2201/126* (2013.01); *B64C 2201/165* (2013.01); *B64C 2201/18* (2013.01); *B64D 45/06* (2013.01)

(56) References Cited

U.S. PATENT DOCUMENTS

| | | | |
|---|---|---|---|
| 3,107,888 A | | 10/1963 | Finn |
| 3,997,136 A | | 12/1976 | Finn et al. |
| 4,046,339 A | * | 9/1977 | Stancliffe ................ 244/103 R |
| 4,436,261 A | * | 3/1984 | Koleff ............................ 244/51 |
| 5,056,737 A | * | 10/1991 | Taylor ........................... 244/7 B |
| 6,550,715 B1 | | 4/2003 | Reynolds et al. |
| 6,860,346 B2 | * | 3/2005 | Burt et al. ....................... 180/8.2 |
| 7,331,838 B2 | | 2/2008 | Shantz |
| 7,335,000 B2 | * | 2/2008 | Ferguson ........................... 417/7 |
| 7,794,300 B2 | * | 9/2010 | Moll et al. ...................... 446/164 |
| 7,959,104 B2 | * | 6/2011 | Kuntz ............................... 244/2 |
| 8,167,234 B1 | * | 5/2012 | Moore ....................... 244/17.25 |
| 8,197,298 B2 | * | 6/2012 | Willett ........................... 446/164 |
| 8,342,440 B2 | * | 1/2013 | Papanikolopoulos et al. .... 244/2 |
| 8,794,564 B2 | * | 8/2014 | Hutson ...................... 244/17.17 |
| 8,794,566 B2 | * | 8/2014 | Hutson ...................... 244/17.23 |
| 2008/0048065 A1 | * | 2/2008 | Kuntz ........................ 244/17.23 |
| 2010/0012776 A1 | * | 1/2010 | Hursig et al. ................... 244/81 |
| 2011/0139923 A1 | * | 6/2011 | Papanikolopoulos et al. .... 244/2 |
| 2014/0061362 A1 | * | 3/2014 | Olm et al. ......................... 244/2 |
| 2014/0131507 A1 | * | 5/2014 | Kalantari et al. ................. 244/2 |

* cited by examiner

REMOTELY CONTROLLED MICRO/NANOSCALE AERIAL VEHICLE COMPRISING A SYSTEM FOR TRAVELING ON THE GROUND, VERTICAL TAKEOFF, AND LANDING

CROSS-REFERENCE TO RELATED APPLICATION

This application is the U.S. national phase of PCT Application No. PCT/EP2012/055435 filed on Mar. 27, 2012, which claims priority to French Patent Application No. 1152585 filed on Mar. 29, 2011, the disclosures of which are incorporated in their entirety by reference herein.

The present invention relates to a remote-controlled micro/nanoscale aerial vehicle comprising a system for taxiing, vertical takeoff, and landing.

Context of the Invention and Problems Addressed

Micro/nanoscale aerial vehicles are being used more and more frequently for remote-controlled surveillance or reconnaissance missions, for example inside buildings. Such devices are aircraft weighing as little as a few tens of grams to several hundred grams, often having propellers driven by electric motors.

The specific requirements for outdoor missions and missions inside buildings are quite different, with requirements for stationary or precise flight inside buildings and the need for fast flight so as to overcome the effects of wind outside. Thus, microdrones intended for outdoor flight are often of the fixed-wing type, whereas microdrones for reconnaissance use in enclosed spaces are often of the rotary-wing type. Vehicles having four ducted horizontal rotors, connected to a central body by rigid spars, are in particular known in this field.

Multi-mission requirements are now emerging, with none of these conventional configurations being entirely satisfactory.

SUMMARY OF THE INVENTION

With the aim of proposing a multi-mission microdrone, the invention relates in a first instance to a microscale aerial vehicle comprising a remote-controlled fixed-wing microdrone, having a longitudinal vertical plane of symmetry XZ, said microdrone comprising propulsion means.

The microscale vehicle comprises wheels attached to the lateral ends of a wing of the fixed wing surface of the microdrone, the axis of rotation Y1 of the wheels being parallel to the transverse axis Y of the microdrone, this axis of rotation Y1 of the wheels being located in the forward portion of the wing, the wheels having a diameter D such that the propulsion means and the fixed wing surface do not project beyond the cylinder defined by the two wheels.

Thus, as well as their taxiing function, the wheels also act as protective structures for the microdrone.

According to various embodiments, which may be used in combination:

The axis of rotation of the wheels Y1 is arranged, with respect to the longitudinal axis X, forward of the center of gravity of the microdrone such that, when the propulsion means provide no thrust, the weight of the microdrone itself tends to place it in a vertical plane, that is to say in the vertical takeoff position.

The center of gravity of the microdrone is located, with respect to the longitudinal axis X, forward of the aerodynamic center of the microdrone, providing the microdrone with static stability when in horizontal flight.

The axis of rotation of the wheels Y1 is aligned with the axis of thrust of the propulsion means in order to avoid a moment acting on the vehicle when these propulsion means are in operation. "Aligned with" is to be understood as meaning that the two axes intersect.

The side wheels can be removed from the wing simply by pulling on the wheel hubs. Thus, the microscale vehicle can easily be adapted to various missions involving or not involving a taxiing phase or a phase of waiting on the ground.

The axis of rotation Y1 of the wheels is located in the forward portion of the wing, at a distance from the leading edge which is between 5 and 20% of the chord of the wing.

According to one advantageous embodiment, each side wheel is connected to its hub by a collection of spokes, wherein these spokes curve inward, each side wheel being located in a longitudinal plane XZ close to the longitudinal axis of a propulsion means, the curvature of the spokes matching the profile of the wing, such that this profile does not project beyond this curvature of the spokes.

According to another embodiment, each side wheel is connected to its hub by a collection of spokes, wherein the side wheels are substantially planar, their spokes being coplanar. This arrangement increases the stability of the microscale vehicle when it is moving on the ground.

According to one preferred embodiment, the wing comprises two elevons located on either side of the longitudinal plane XZ of the microdrone, attached to the rear portion of the wing and articulated about one and the same transverse axis.

The microscale vehicle then preferably comprises means for controlling the elevons independently from one another so as to make it easier to control.

More particularly, each of these elevons is secured to a vertical stabilizer which is perpendicular to the plane of the wing, these vertical stabilizers extending in opposite directions, such that movements of the elevons result in deflections of the vertical stabilizers.

In this case, according to one favorable embodiment, the vertical stabilizers of the microdrone are dimensioned such that, when they are in the neutral position, i.e. not deflected, the end of each of these vertical stabilizers projects slightly and in the opposite direction beyond the cylinder defined by the wheels.

More particularly, in this case, these ends are located in a plane which is tangential to the cylinder defined by the wheels.

In one preferred embodiment, the propulsion means comprise two counter-rotating propellers arranged on the forward portion of the wing, with respect to the longitudinal axis X, on either side of the longitudinal vertical plane of symmetry XZ of the microscale vehicle.

The microscale vehicle preferably comprises means for controlling the operation of the propellers independently of one another so as to make it easier to control, both in flight and on the ground.

In a second instance, the invention relates to a method for controlling a microscale vehicle as disclosed when on the ground, said method comprising:
deflecting the elevons so as to tilt the fuselage,
starting the propulsion means.

The invention also relates to a method for controlling a microscale vehicle as disclosed along any inclined surface, in particular a wall or ceiling, comprising a control step of keeping a component of the thrust of the propulsion means oriented toward this surface.

Finally, the invention relates to a kit for converting a remote-controlled fixed-wing microdrone, having a longitudinal vertical plane of symmetry XZ, said microdrone comprising propulsion means.

The kit comprises:
what are termed side wheels,
means for attaching said side wheels to the lateral ends of a wing of the fixed wing surface of the microdrone, the axis of rotation Y1 of the side wheels being parallel to the transverse axis Y of the microdrone,
the side wheels having a diameter D such that the propulsion means and the fixed wing surface of the microdrone do not project beyond the cylinder defined by the side wheels when these are installed on the microdrone.

BRIEF DESCRIPTION OF THE FIGURES

The following description, given purely as an example of an embodiment of the invention, refers to the appended figures, in which.

DETAILED DESCRIPTION OF AT LEAST ONE PREFERRED EMBODIMENT OF THE INVENTION

Figure 1:
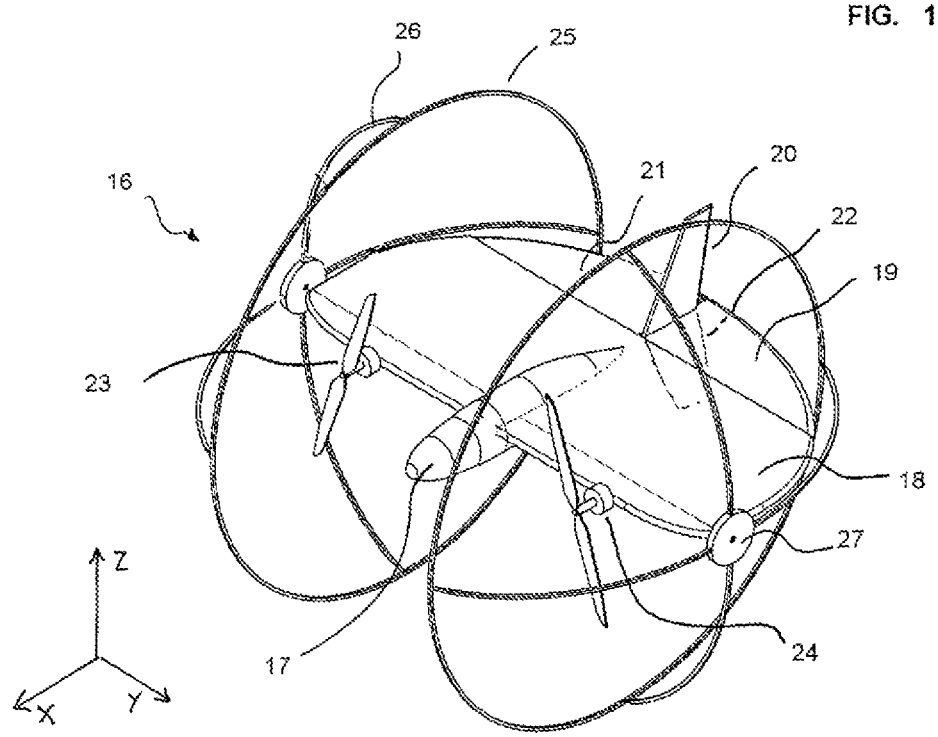
FIG. 1 is a view in perspective of a microscale aerial vehicle having a taxiing device.
Figure 2:
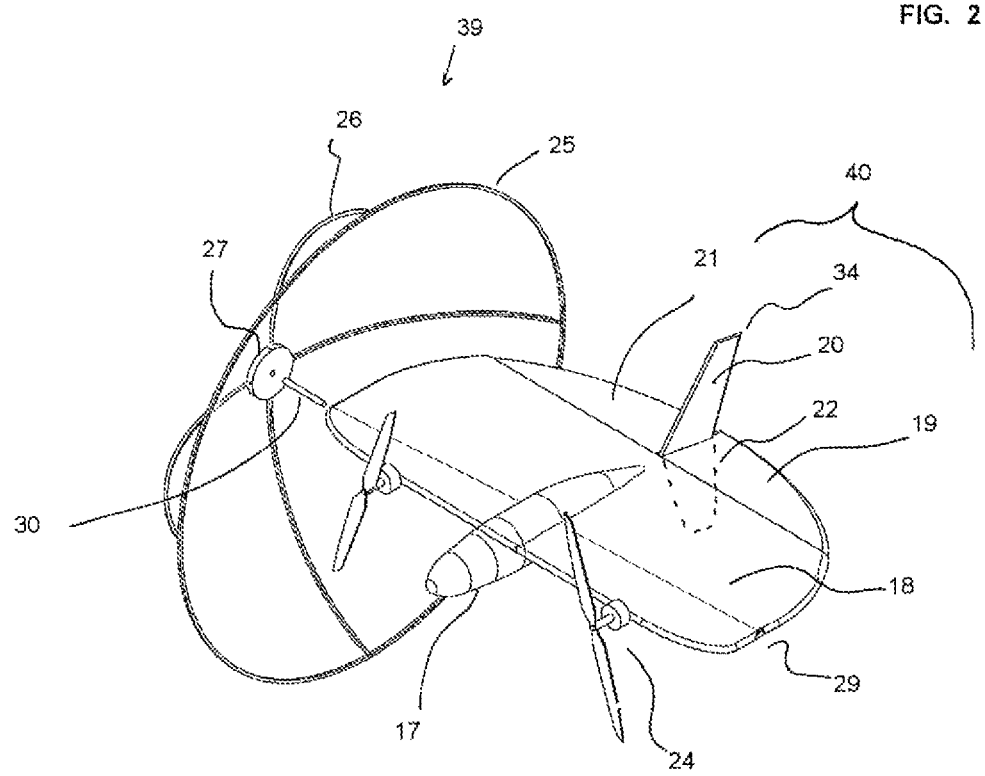
FIG. 2 is a view similar to FIG. 1, with a single wingtip wheel in the assembly position.

As shown in FIGS. 1 and 2, a taxiing drone 16 according to the invention comprises, principally, a microdrone 40 to which is fitted a taxiing and protection device 39.

In the present text, a microdrone is to be understood as a remote-controlled or autonomous flying vehicle, generally having a wingspan of several tens of centimeters. The following description also applies to the case of nanodrones, whose wingspan is generally less than ten centimeters.

The following are defined for the remainder of the description:
a longitudinal axis X located in a horizontal plane and in line with the direction of motion of the microdrone 40;
a transverse axis Y located in the horizontal plane and perpendicular to the longitudinal axis X;
a vertical axis Z which completes this reference frame.

The terms "forward", "rear", "upper", "lower", "left, "right" etc. will be defined with reference to these axes in the remainder of the description.

The microdrone 40 comprises, first and foremost, a fuselage 17 designed to accommodate, for example, a camera or other equipment specific to the planned mission. The microdrone 40 further comprises a wing 18, the forward portion of which is secured to the fuselage 17. As a non-limiting example, the span of the wing 18 is in this case approximately thirty centimeters and the chord length about fifteen centimeters. The fuselage and the wing are made of a lightweight material in a manner known to a person skilled in the art of microdrones.

The forward portion of the wing 18 supports two propellers 23, 24 which are driven by motors, for example electric motors, wherein these propellers 23, 24 are arranged at the front of the wing 18 on either side of the fuselage 17. These propellers 23, 24 are in this case counter-rotating.

The motors for the propellers 23, 24 are controlled independently, making it possible in horizontal flight to ensure that the vehicle holds its course and, when on the ground, to steer the vehicle by using the thrust generated by each propeller by virtue of the propellers being arranged on either side of the longitudinal plane of symmetry of the microdrone. This arrangement on either side of the longitudinal plane of symmetry also makes for simple assembly, in contrast to arrangements comprising two propellers arranged on one and the same axis, as these require in particular the use of a hollow shaft and a complex and fragile drive mechanism.

Energy is supplied to the motors for the propellers 23, 24 by batteries; the motors are controlled by an electronics which are per se outside the scope of the present invention and are therefore not explained in more detail here.

The wing 18 comprises two elevons 19, 21, located on either side of the longitudinal axis X of the microdrone 40, attached to the rear portion of the wing, and articulated about one and the same transverse axis. These elevons 19, 21 are controlled independently. Controlling the movements of these elevons 19, 21 makes it possible, in a manner known per se, to control the pitch and roll of the microdrone 40. The control logic of the microdrone is outside the scope of the present invention.

Figure 3:
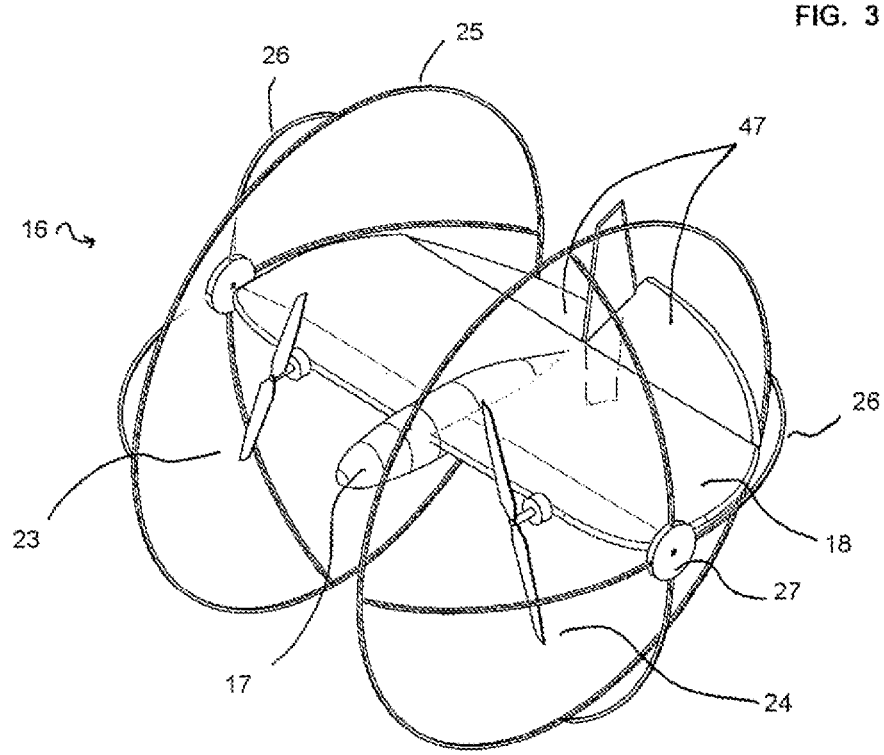
FIG. 3 is a view in perspective similar to FIG. 1, with the horizontal control surfaces deflected in opposite directions, showing how each is connected with a vertical stabilizer.

Each of these elevons 19, 21 is secured to a vertical stabilizer which is perpendicular to the plane of the wing 18 in the present example (and more generally not parallel thereto): the left elevon 19 is secured to an "upper" vertical stabilizer 20, located above the plane of the wing 18, and the right elevon 21 is secured to a "lower" vertical stabilizer 22, located below the plane of the wing 18. The various movements of the elevons 19, 21 thus result in the vertical stabilizers 20, 22 being deflected, as shown in FIG. 3.

The taxiing and protection device 39 of the taxiing drone 16 comprises two side wheels 25. Each of these side wheels 25 is attached to one lateral end of the wing 18 by means of a hub 27 and an axial rod 30 which is inserted into a housing 29 created in the thickness of the wing 18. Each side wheel 25 is free to rotate in its housing 29, for example by means of ball bearings arranged inside said housing 29. In the embodiment considered here, the side wheels 25 can be removed simply by pulling on the hub 27.

The axis of rotation Y1 of the wheels 25 is thus parallel to the transverse axis Y. This axis of rotation Y1 of the wheels 25 is located in the forward portion of the wing 18, in the present example at a distance from the nearby leading edge which is approximately 10% of the chord of the wing 18.

More generally, the axis of rotation Y1 of the wheels 25 is arranged forward of the center of gravity 31 of the microdrone 40 such that, when the propellers 23, 24 produce no thrust, the weight of the microdrone 40 itself tends to place it in a vertical plane YZ, that is to say in the vertical takeoff position.

Moreover, the center of gravity 31 of the microdrone 40 is located forward of the aerodynamic center 32 of the microdrone, providing the microdrone with static stability when in horizontal flight.

Finally, the axis of rotation Y1 of the wheels 18 is aligned with the axis of thrust of the propellers 23, 24 in order to avoid a moment of rotation acting on the vehicle when these propellers are in operation.

Figure 4:
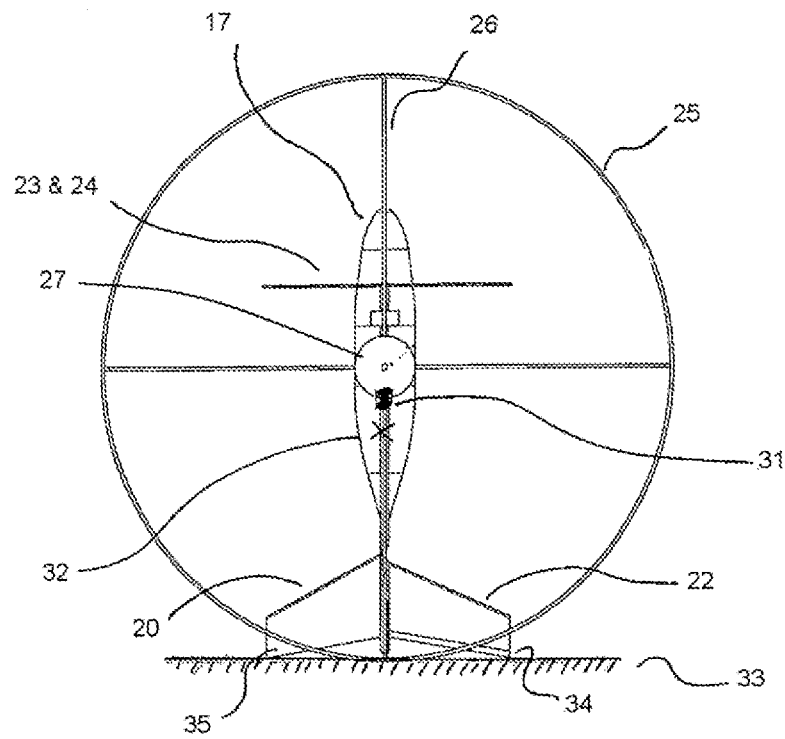
FIG. 4 is a side view of the microscale aerial vehicle of FIG. 1, arranged vertically upright on the ground and ready for takeoff.

The diameter D of the wheels 25 is in this case approximately thirty centimeters. As shown in FIG. 4, this diameter D is chosen such that the radius D/2 is greater than the distance between the axis of rotation Y1 of the wheels and the trailing edge of the elevons 19, 21. Similarly, this diameter D is preferably such that the propellers 23, 24 do not project beyond the cylinder defined by the two wheels 25.

The wheels 25 thus protect the propellers 23, 24 and the wing 18 in the event of the microdrone 40 hitting an obstacle.

Each wheel 25 is connected to the corresponding hub 27 by means of a collection of spokes 26, in this embodiment four spokes, the number of spokes being in no way limiting.

Figure 7:
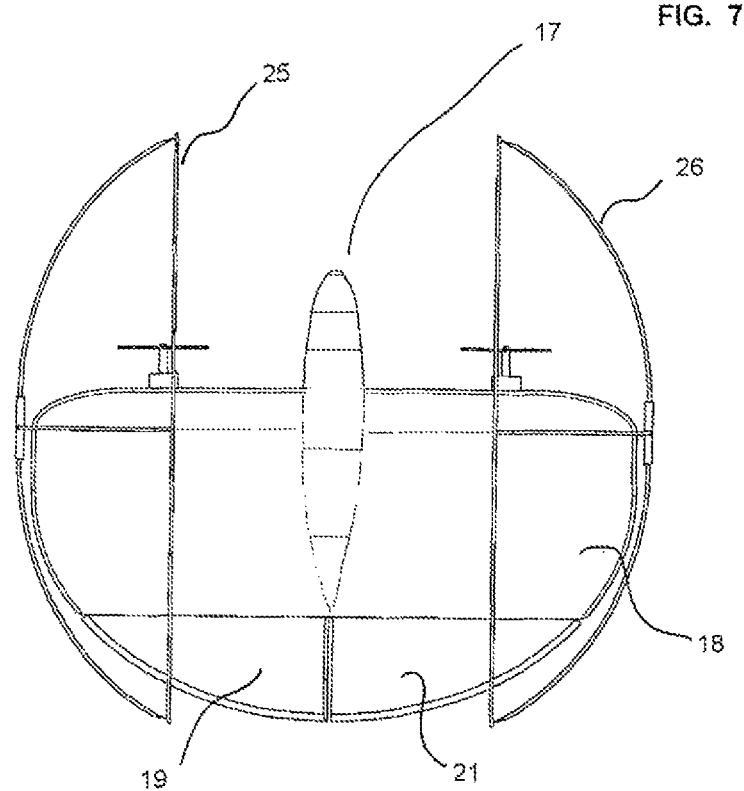
FIG. 7 is a view from above of the microscale aerial vehicle shown in FIG. 1.
Figure 8:
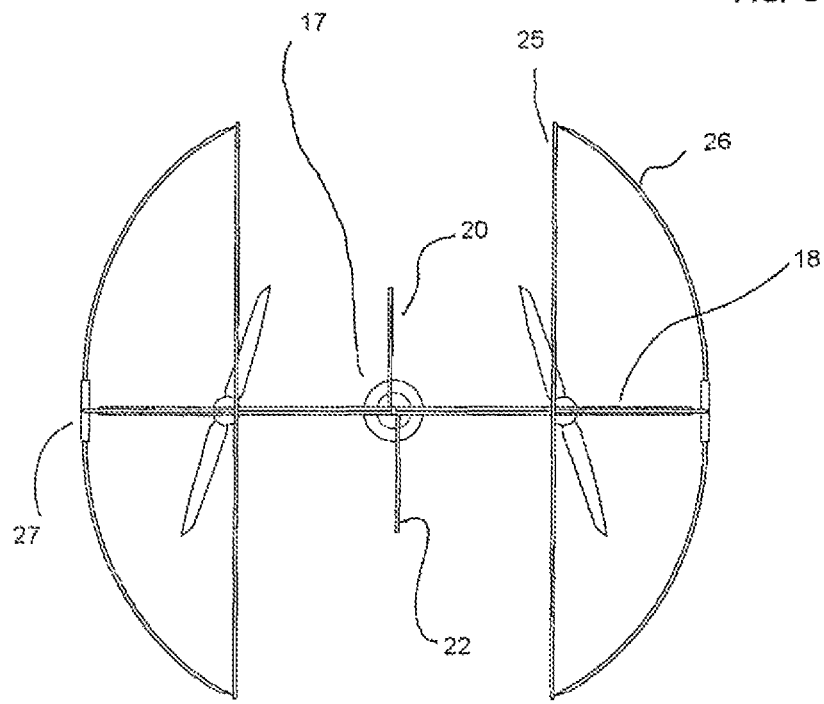
FIG. 8 is a view from the rear of the microscale aerial vehicle shown in FIG. 1.

As shown in FIGS. 7 and 8, in the present example these spokes 26 curve inward, wherein each wheel 25 is located in a longitudinal plane XZ which is close to the axis of a propeller 23, 24.

The curvature of the spokes 26 matches the profile of the wing 18, such that the latter does not project beyond this curvature (see FIG. 7).

With a view to minimizing the weight of the microdrone, the wheels 25 and the spokes 26 are in this case made of carbon fiber or any other lightweight material.

In the present embodiment, the vertical stabilizers 20, 22 of the microdrone 40 are dimensioned such that, when they are in the neutral position, i.e. not deflected, the end 34, 35 of each of these vertical stabilizers projects slightly and in the opposite direction, in this case by several centimeters, beyond the cylinder defined by the wheels 25. Moreover, these ends 34, 35 are located in a plane which is tangential to the cylinder defined by the wheels 25 (see FIG. 4).

In this way, in the neutral position, with the taxiing drone 16 located on a horizontal plane, a position of stable equilibrium is established when the fuselage is arranged in the vertical axis Z, with the vertical stabilizers 20, 22 resting with their ends 34, 35 on the horizontal plane.

Mode of Operation

Starting from a resting position on a substantially horizontal surface 33, as shown in FIG. 4, the taxiing drone 16 can of course take off vertically by using its propellers 23, 24.

Figure 5:
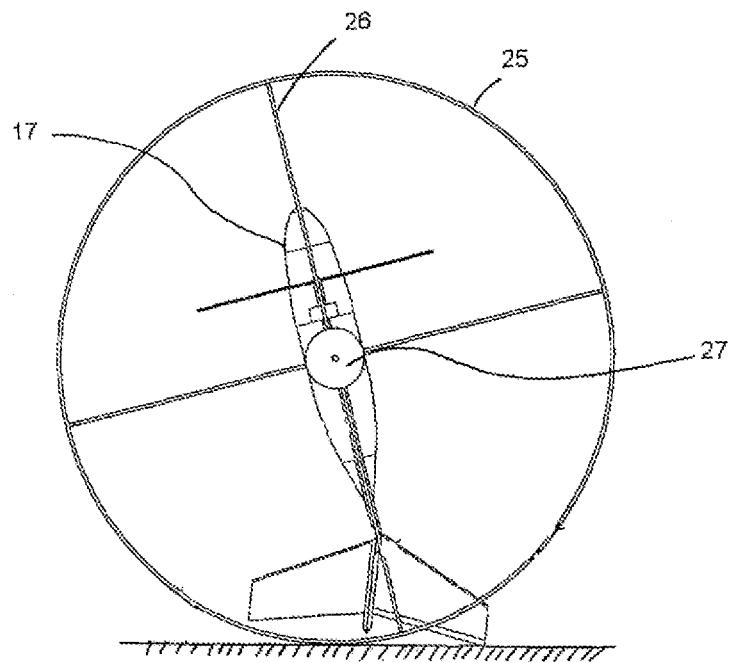
FIG. 5 is a view similar to FIG. 4, with a microscale aerial vehicle which is beginning to taxi. The horizontal control surfaces are deflected symmetrically.
Figure 6:
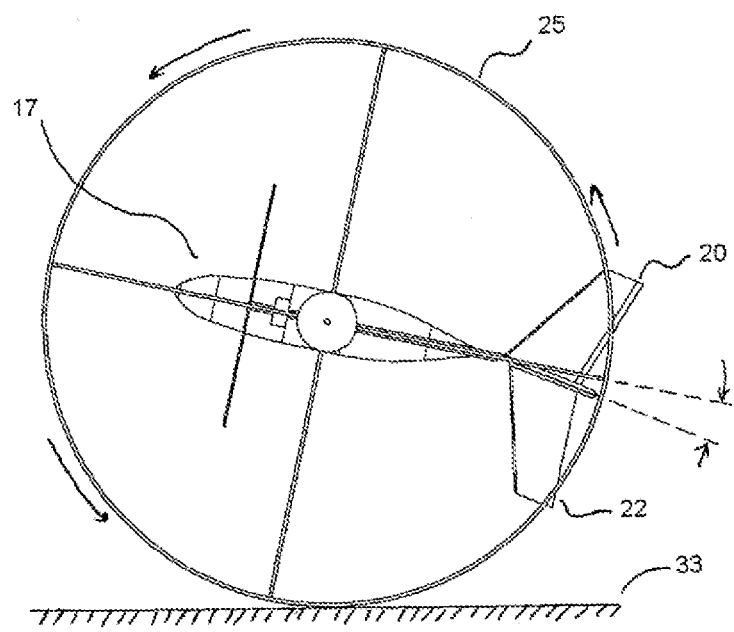
FIG. 6 is a view similar to FIGS. 4 and 5, with the vehicle moving along the ground toward the left of the figure.

It is also possible to deflect the elevons 19, 21 so as to tilt the fuselage 17 (FIG. 5). Then, starting the propellers 23, 24 in combination with this deflection of the elevons makes for additional tilting of the microdrone 40 (FIG. 6), allowing it to taxi under the action of the thrust of the propellers.

In the same fashion, it is possible to order the microdrone to move across any plane or surface, in particular a wall or ceiling, by keeping a component of the thrust of the propellers 23, 24 oriented toward this surface.

This concept can be applied to a large number of vertical takeoff microdrones, by adding the taxiing system to the end of a wing, provided that the wing is stiff enough. The invention therefore also relates to a kit for converting such a microdrone into a vehicle capable of taxiing.

ADVANTAGES OF THE INVENTION

It is understood that the device provides significant advantages over the prior art.

This invention relates to a multi-mission microscale aerial vehicle. It comprises elements allowing a microscale aerial vehicle to move or roll across a surface, in particular on the ground, and making it capable of taking off again once from the ground.

The "taxiing structure" portion of the invention protects the vehicle when flying close to an obstacle such as a wall, and when it falls to the ground.

The arrangement of the propellers on either side of the longitudinal plane of symmetry of the microdrone makes it easy to control the drone when on the ground and in flight.

The ability to translate in the air is not necessary in certain situations, such as missions inside a building.

In this case, translation on the ground, which uses less energy, is sufficient to complete the mission. The ability to move on the ground makes it possible to save energy and thus to increase mission times for the vehicle.

Furthermore, the described configuration makes it possible to take off again after a fall, in whatever position on the ground.

The described microdrone has the ability to switch between horizontal and vertical flight. This is in part due to the counter-rotating propellers. Moreover, by using propellers in a tractor configuration, it is possible to compensate for the loss of effectiveness of the control surfaces in near-stationary vertical flight (due to the airspeed of the vehicle being zero) in that these propellers generate an airflow over these control surfaces.

ALTERNATIVE FORMS OF THE INVENTION

The scope of the present invention is not restricted to the details of the above embodiments which are considered by way of example, but instead extends to those modifications which may be implemented by one skilled in the art.

Figure 9:
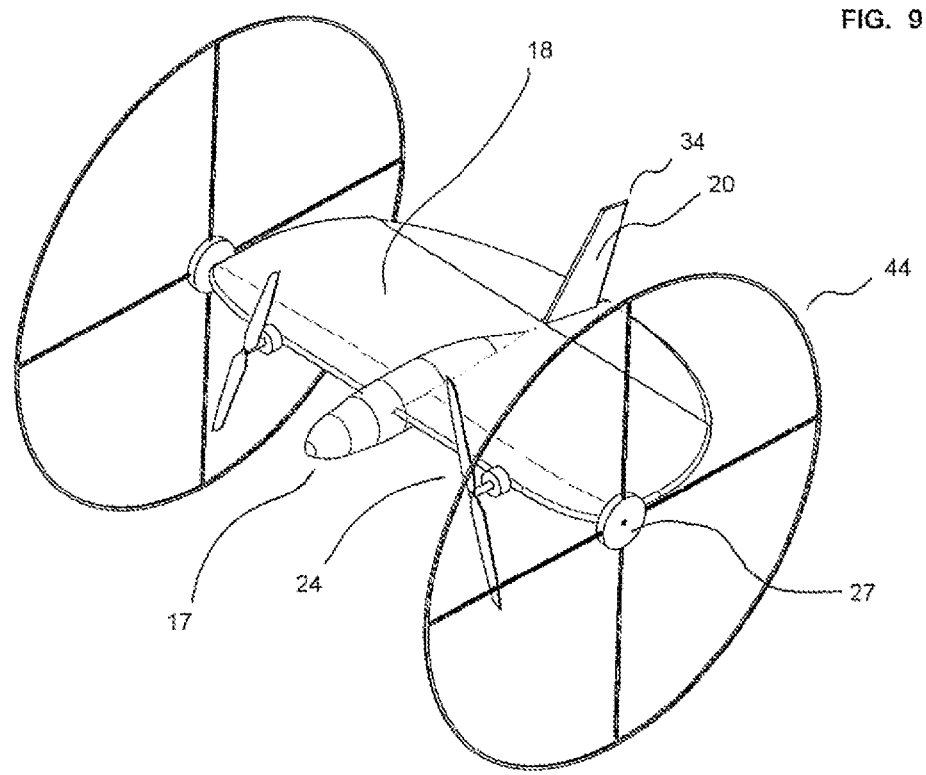
FIG. 9 is a view in perspective of a microscale aerial vehicle variant having another form of taxiing structure.

In a first implementation variant, illustrated in FIG. 9, the wheels 25 are replaced by planar wheels 44, the spokes of which are coplanar. This arrangement increases the lateral stability of the taxiing drone 16 when on the ground.

Figure 10:
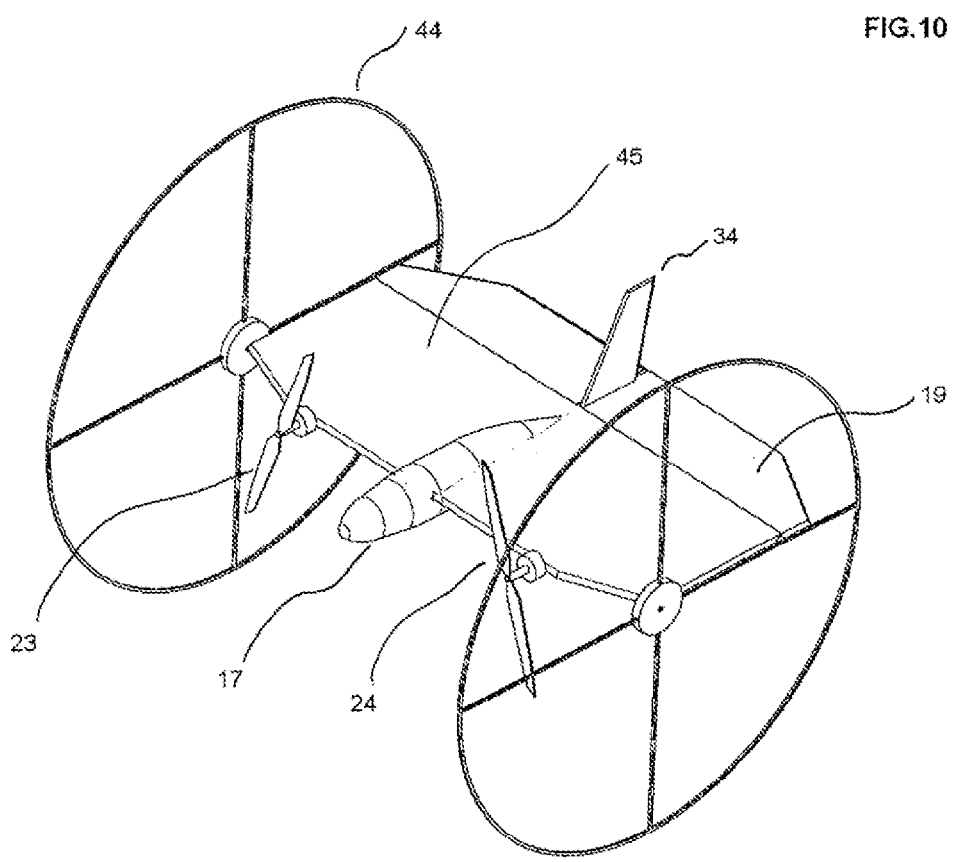
FIG. 10 is a view in perspective of another variant having a different wing shape.

In a second variant (FIG. 10), the wing of the microdrone is in the shape of an elongate octagon 45.

Figure 11:
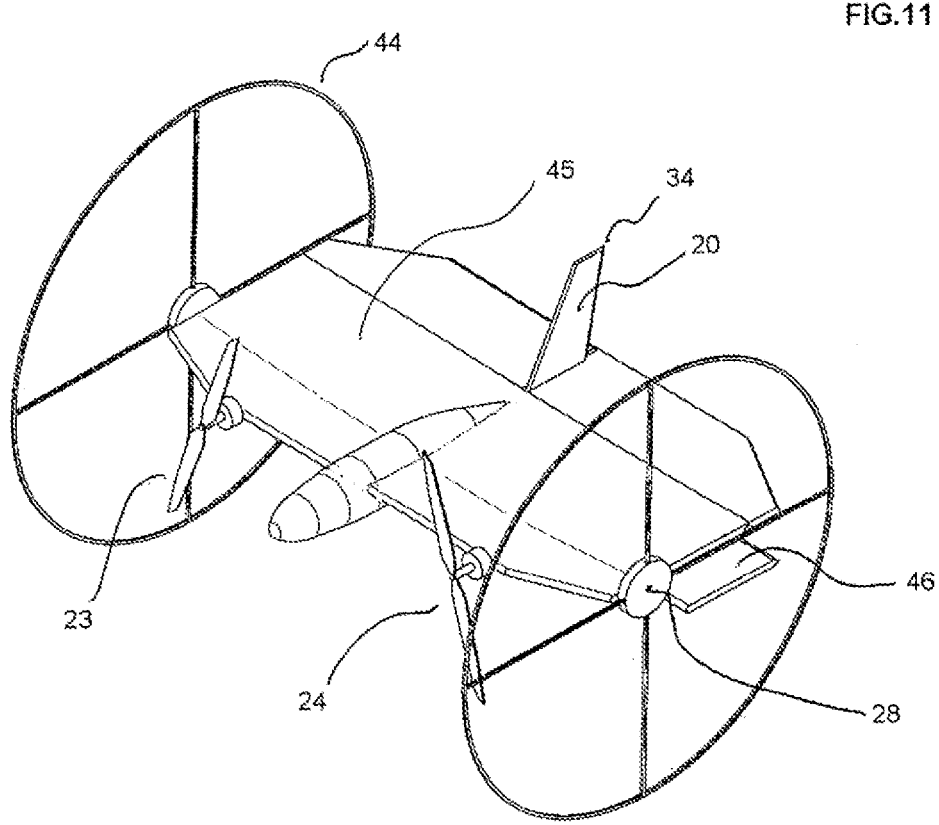
FIG. 11 is a view in perspective of another embodiment of this invention.
Figure 12:
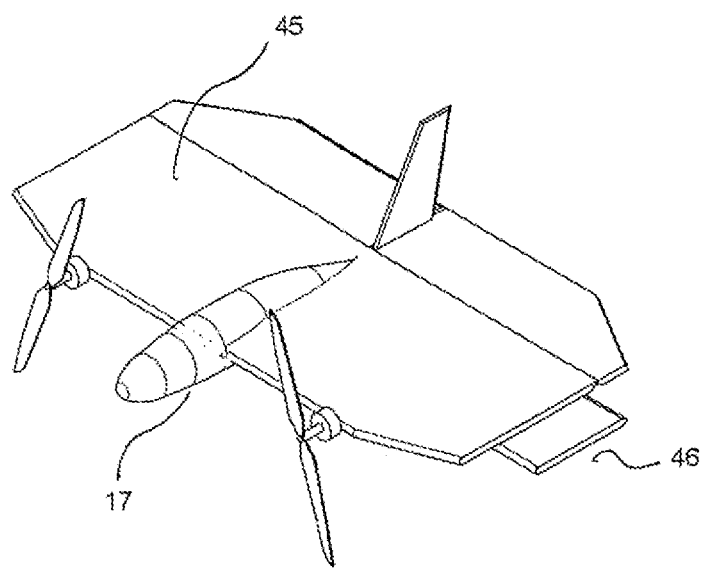
FIG. 12 is a view in perspective of the embodiment shown in FIG. 11, without a taxiing structure.

In yet another variant (see FIGS. 11 and 12), the microdrone 40 is of the biplane type, having a second wing 46 arranged below and to the rear of the main wing 45.

The invention claimed is:
1. A microscale aerial remote-controlled fixed-wing microdrone, comprising:
a fixed wing having a longitudinal vertical plane of symmetry XZ, having at least one propulsion device mounted on the fixed wing; and
a pair of side wheels attached to the lateral ends of the fixed wing of the microdrone, the wheels having an axis of rotation Y1 parallel to a transverse axis Y of the microdrone,
wherein, the side wheels have a diameter D such that the propulsion device and the fixed wing do not project beyond a cylinder defined by the two side wheels.

2. The microscale vehicle as claimed in claim 1, wherein the axis of rotation Y1 of the side wheels is arranged, with respect to a longitudinal axis X, forward of a center of gravity of the microdrone.

3. The microscale vehicle as claimed in claim 1, wherein the center of gravity of the microdrone is located, with respect to the longitudinal axis X, forward of an aerodynamic center of the microdrone.

4. The microscale vehicle as claimed in claim 1, wherein the axis of rotation Y1 of the side wheels is aligned with an axis of thrust of the propulsion device.

5. The microscale vehicle as claimed in claim 1, wherein the side wheels can be removed from the wing by pulling on the wheel hubs.

6. The microscale vehicle as claimed in claim 1, wherein the axis of rotation Y1 of the wheels is located in the forward portion of the wing at a distance from the nearby leading edge which is between 5 and 20% of the chord of the wing.

7. The microscale vehicle as claimed in claim 1, wherein each side wheel is connected to the wheel hub by a collection of spokes, wherein these spokes curve inward, each side wheel being located in a longitudinal plane XZ close to the longitudinal axis of a propulsion device, the curvature of the spokes matching a profile of the wing, such that the profile does not project beyond this curvature of the spokes.

8. The microscale vehicle as claimed in claim 1, wherein each side wheel is connected to a vehicle hub by a collection of spokes, wherein the side wheels substantially planar, the spokes of each wheel being coplanar.

9. The microscale vehicle as claimed in claim 1, wherein the wing comprises two elevons located on either side of the longitudinal plane XZ of the microdrone, attached to the rear portion of the wing and articulated about a common axis, parallel to the aircraft transverse axis.

10. The microscale vehicle as claimed in claim 9, wherein the vehicle comprises means for controlling the elevons independently from one another.

11. The microscale vehicle as claimed in claim 10, wherein the vehicle comprises two vertical stabilizers, perpendicular to the plane of the wing, each attached to one of the elevons, these vertical stabilizers extending in opposite directions, such that movements of the elevons result in deflections of the vertical stabilizers.

12. The microscale vehicle as claimed in claim 11, wherein the vertical stabilizers of the microdrone are dimensioned such that, when the vertical stabilizers are in a neutral non deflected position, the end of each of the vertical stabilizers projects slightly and in the opposite direction beyond the cylinder defined by the wheels.

13. The microscale vehicle as claimed in claim 12, wherein the ends are located in a plane which is tangential to the cylinder defined by the wheels.

14. The microscale vehicle as claimed in claim 1, wherein the propulsion device comprise two counter-rotating propellers arranged on the forward portion of the wing, with respect to a longitudinal axis X, located on opposite sides of the longitudinal vertical plane of symmetry XZ of the microscale vehicle.

15. The microscale vehicle as claimed in claim 14, wherein the vehicle comprises means for controlling the operation of the propellers independently of one another.

16. A method for controlling a microscale vehicle as claimed in claim 12 when on the ground, said method comprising:
    deflecting the elevons; and,
    starting the propulsion device.

17. A method for controlling a microscale vehicle as claimed in claim 9 along any inclined surface, comprising providing a control step of changing the inclination of the elevons, to keep a component of the thrust of the propulsion device oriented toward the surface, so as to allow the microscale vehicle to roll on the inclined surface.

18. A kit for converting a remote-controlled fixed-wing microdrone having a longitudinal vertical plane of symmetry XZ, said microdrone having a propulsion device affixed to a fixed wing, wherein the kit comprises;
    a pair of side wheels, and
    means for attaching said side wheels to distal ends of a wing of the fixed wing microdrone, with the axis of rotation Y1 of the side wheels being parallel to a transverse axis Y of the microdrone,
    wherein, the side wheels have a diameter D such that the propulsion device and the fixed wing of the microdrone do not project beyond the cylinder defined by the side wheels when said wheels are installed on the microdrone.

* * * * *